(12) United States Patent
Fernando et al.

(10) Patent No.: US 7,386,878 B2
(45) Date of Patent: Jun. 10, 2008

(54) AUTHENTICATING PEER-TO-PEER CONNECTIONS

(75) Inventors: Joseph P. Fernando, Woodinville, WA (US); Mehul Y. Shah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 962 days.

(21) Appl. No.: 10/218,877

(22) Filed: Aug. 14, 2002

(65) Prior Publication Data

US 2004/0034776 A1 Feb. 19, 2004

(51) Int. Cl.
*G06K 9/00* (2006.01)

(52) U.S. Cl. .................. 726/3; 726/12 X; 709/227; 713/170; 713/171

(58) Field of Classification Search .............. 726/2–4, 726/12, 17, 21, 27, 30; 713/161, 170, 171; 709/203, 232, 223–225, 227–228; 380/228–229, 380/232, 277, 282, 285, 30
See application file for complete search history.

(56) References Cited

U.S. PATENT DOCUMENTS

| 5,542,046 | A   | * | 7/1996  | Carlson et al. ............... 726/5 |
|-----------|-----|---|---------|--------------------------------------|
| 5,953,420 | A   |   | 9/1999  | Matyas, Jr. et al.                   |
| 6,158,011 | A   | * | 12/2000 | Chen et al. ................... 726/15 |
| 6,212,633 | B1  | * | 4/2001  | Levy et al. .................. 713/153 |
| 6,484,257 | B1  | * | 11/2002 | Ellis ........................... 713/153 |
| 6,643,701 | B1  | * | 11/2003 | Aziz et al. ................... 709/227 |
| 6,651,105 | B1  | * | 11/2003 | Bhagwat et al. ............ 709/239 |
| 6,751,729 | B1  | * | 6/2004  | Giniger et al. .............. 713/153 |
| 6,804,705 | B2  | * | 10/2004 | Greco et al. ................. 709/219 |
| 6,904,110 | B2  | * | 6/2005  | Trans et al. ................. 375/350 |
| 6,959,393 | B2  | * | 10/2005 | Hollis et al. ................. 726/21 |
| 6,993,651 | B2  | * | 1/2006  | Wray et al. .................. 713/151 |
| 7,002,988 | B1  | * | 2/2006  | Benedyk et al. ............ 370/467 |
| 7,003,282 | B1  | * | 2/2006  | Ekberg ....................... 455/411 |
| 7,003,480 | B2  | * | 2/2006  | Fox et al. ..................... 705/26 |
| 7,010,303 | B2  | * | 3/2006  | Lewis et al. ................. 455/445 |
| 7,031,945 | B1  | * | 4/2006  | Donner ........................ 705/64 |
| 7,047,406 | B2  | * | 5/2006  | Schleicher et al. ......... 713/168 |
| 7,139,918 | B2  | * | 11/2006 | Chang et al. ............... 713/193 |
| 7,149,893 | B1  | * | 12/2006 | Leonard et al. ............. 713/154 |
| 7,181,620 | B1  | * | 2/2007  | Hur ............................. 713/171 |
| 7,263,070 | B1  | * | 8/2007  | Delker et al. ............... 370/254 |
| 7,287,052 | B2  | * | 10/2007 | Chen et al. .................. 709/203 |

OTHER PUBLICATIONS

Kolesnikov, Vladimir, Ph.D.: Secure Two-Party Computation and Communication, University of Toronto (Canada), 2006, Abstract (summary).*

(Continued)

*Primary Examiner*—Kim Vu
*Assistant Examiner*—Leynna T. Ha
(74) *Attorney, Agent, or Firm*—Senniger Powers LLP (57) ABSTRACT

Systems and methods employing authenticated connections to a central server to establish and authenticate a peer-to-peer connection between peer devices. The invention circumvents the potential vulnerability of clear-text transmission of secrets through a series of encrypted data transfers. A secret key is encrypted and then transmitted from one peer device to another using authenticated connections to the server. The secret key is then used to transmit encrypted data over a peer connection between the peer devices for the purpose of authenticating the peer devices on each end of the connection.

51 Claims, 4 Drawing Sheets

OTHER PUBLICATIONS

Hsiang-An Wen, Chun-Li Lin, and Tzonelih Hwang: Provably Secure Authenticated Key Exchange Protocols for Low Power Computing Clients, Mar. 2006, Elsevier Ltd., vol. 25, Issue 2, pp. 106-113.*

Karrer et al., "Dynamic Handoff of Multimedia Streams," 11th International Workshop on Network and Operating Systems Support for Digital Audio and Video, 2001, pp. 125-133, ACM Press, New York, U.S.A.

Godefroid et al., "Ensuring Privacy in Presence Awareness: an Automated Verification Approach," Proceeding of the ACM 2000 Conference on Computer Supported Cooperative Work, 2000, pp. 59-68, ACM Press, New York, U.S.A.

Frécon et al., "The DiveBone—An Application-Level Network Architecture for Internet-Based CVEs," Proceedings of the ACM Symposium on Virtual Reality Software and Technology, 1999, pp. 58-65, ACM Press, New York, U.S.A.

"Windows 2000 Kerberos Authentication," www.microsoft.com, Microsoft Corporation, 2002, 34 pages, U.S.A.

Coleridge, "The Cryptography API, or How to Keep a Secret," msdn.microsoft.com, Microsoft Corporation, Aug. 19, 1996, 11 pages, U.S.A.

"Messenger Service API References," Microsoft Corporation, 2001, 15 pages, U.S.A.

Unknown, Definition of "message," The Authoritative Dictionary of IEEE Standards Terms, 2000, IEEE Press, 7th ed., p. 687, U.S.A.

* cited by examiner

AUTHENTICATING PEER-TO-PEER CONNECTIONS

TECHNICAL FIELD

The present invention relates to the field of peer-to-peer communications. In particular, this invention relates to authenticating a connection between peer devices having authenticated connections to a common server.

BACKGROUND OF THE INVENTION

With the increased popularity of the Internet and other computer networks, communication-oriented applications such as instant messaging applications are now widely employed to exchange messages and other data (e.g., files) between peer devices. Instant messaging services often expose, among other features, mechanisms to detect presence information about a designated peer (sometimes referred to as a "buddy") and to exchange messages with that peer when the peer is online. When a user gets online, the instant messaging application on the client device typically connects to an instant messaging server that then authenticates the user using a suitable client-server authentication protocol. Thereafter, the server typically identifies for the user those of the user's buddies who are also online and connected to the server, and may likewise inform the user's buddies that the user is online. The user and his or her buddies can then initiate sessions with one another for exchanging messages and other data. The authenticated communication channel between each client device (i.e., either the user or a buddy) and the server commonly remains active throughout the duration that the client is online, until the client chooses to disconnect or shut down the instant messaging application.

If all data exchanged between peer devices is routed through the server, the server typically becomes a limiting factor (e.g., a bottleneck) in terms of data throughput, especially when large amounts of data are transferred as in the case of file transfers. Additionally, some peer devices may wish to communicate with one another using a language or protocol that the server does not support. Though some existing systems may include functionality that allows peer devices to establish direct peer-to-peer connections between the peer devices, such existing systems do not provide mechanisms to authenticate the peer-to-peer connection.

For these reasons, a system for verifying that peers on opposite ends of a peer-to-peer connection are the same peers that previously established authenticated or otherwise trusted connections with a server common to both peers without requiring additional functionality from the common server is desired to address one or more of these and other disadvantages.

SUMMARY OF THE INVENTION

The invention employs authenticated connections between each of multiple peer devices and a common server for establishing and authenticating a peer connection between the peer devices. Software of the invention circumvents the potential vulnerability of clear-text transmission of secrets through a series of encrypted data transfers. A secret key is encrypted and then transmitted from one peer device to another using authenticated connections via a common server. The secret key is then used to transmit encrypted data over a peer connection between peer devices for the purpose of authenticating the peer devices on each end of the connection.

With the authenticated peer-to-peer connection of the invention, the server does not limit the throughput of the peer-to-peer connection, and need not understand the language or protocol used for communications sent through such connection. In addition, the invention software exposes mechanisms that permit other types of applications (e.g., video game applications) to exchange data through the server for the purpose of establishing a peer connection to a peer device and to subsequently use the peer-to-peer connection to exchange application specific data using application specific protocols. In establishing a peer-to-peer connection, one peer device opens a communication port (e.g. a TCP/IP port) for a connection to be established therewith by another peer device. The invention software provides mechanisms to reduce vulnerability created by an unauthorized application program or another peer that might potentially establish a connection on the open port prior to the intended peer. The invention also provides mechanisms to establish such connections when one of the two peers is behind a proxy server or firewall such as those proxy servers or firewalls commonly employed in a corporate network.

In accordance with one aspect of the invention, a method establishes and authenticates a peer connection between at least two client components. The client components each have an authenticated connection to a server. The method includes exchanging a shared key between the client components via the server and establishing a peer-to-peer connection between the client components. In addition, the method includes exchanging the shared key between the client components via the established, peer-to-peer connection and authenticating each of the client components by verifying that the shared key exchanged via the peer-to-peer connection corresponds to the shared key exchanged via the server.

In accordance with another aspect of the invention, a method establishes and authenticates a peer connection between a first device and a second device. The first device and the second device have authenticated connections to a server. The method includes enabling the first device and the second device to exchange a shared key in encrypted form via the authenticated connections, receiving a request from the first device for an identifier associated with the second device, and transmitting the requested identifier to the first device. The first device and the second device establish the peer connection based on the identifier.

In accordance with yet another aspect of the invention, one or more computer-readable media have computer-executable components including a server component and one or more client components. Each of the client components has an authenticated connection to the server component. The server component interacts with each of the client components via the authenticated connection to establish and authenticate a peer connection between one or more of the client components.

In accordance with yet another aspect of the invention, a method secures information between a first device and a second device. The method includes establishing authenticated connections to a server from the first device and from the second device. The method further includes encrypting, in the first device, a shared key using a public key associated with the second device and transmitting the shared key from the first device to the second device via the authenticated connections to the server. The method further includes decrypting, in the second device, the shared key received from the first device and establishing a peer connection between the first device and the second device. The method further includes encrypting, in the second device, the shared key received from the first device using a public key associated with the first device and transmitting the shared key from the second device to the first device via the peer connection. The method also includes decrypting, in the first device, the shared key received from the second device and confirming, in the first device, that the shared key received from the second device via the peer connection is the same as the shared key transmitted to the second device via the authenticated connections to the server to thereby authenticate the second device.

In accordance with yet another aspect of the invention, a method secures information between a first device and a second device. The method includes establishing authenticated connections to a server from the first device and from the second device. The method further includes encrypting, in the first device, a shared key using a public key associated with the second device and transmitting the shared key from the first device to the second device via the authenticated connections to the common server. The method also includes decrypting, in the second device, the shared key received from the first device and establishing a peer connection between the first device and the second device. The method further includes transmitting the shared key from the first device to the second device via the peer connection and decrypting, in the second device, the shared key received from the first device via the peer connection. The method confirms, in the second device, that the shared key received from the first device via the peer connection is the same as the shared key received from the first device via the authenticated connections to the server to thereby authenticate the first device.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
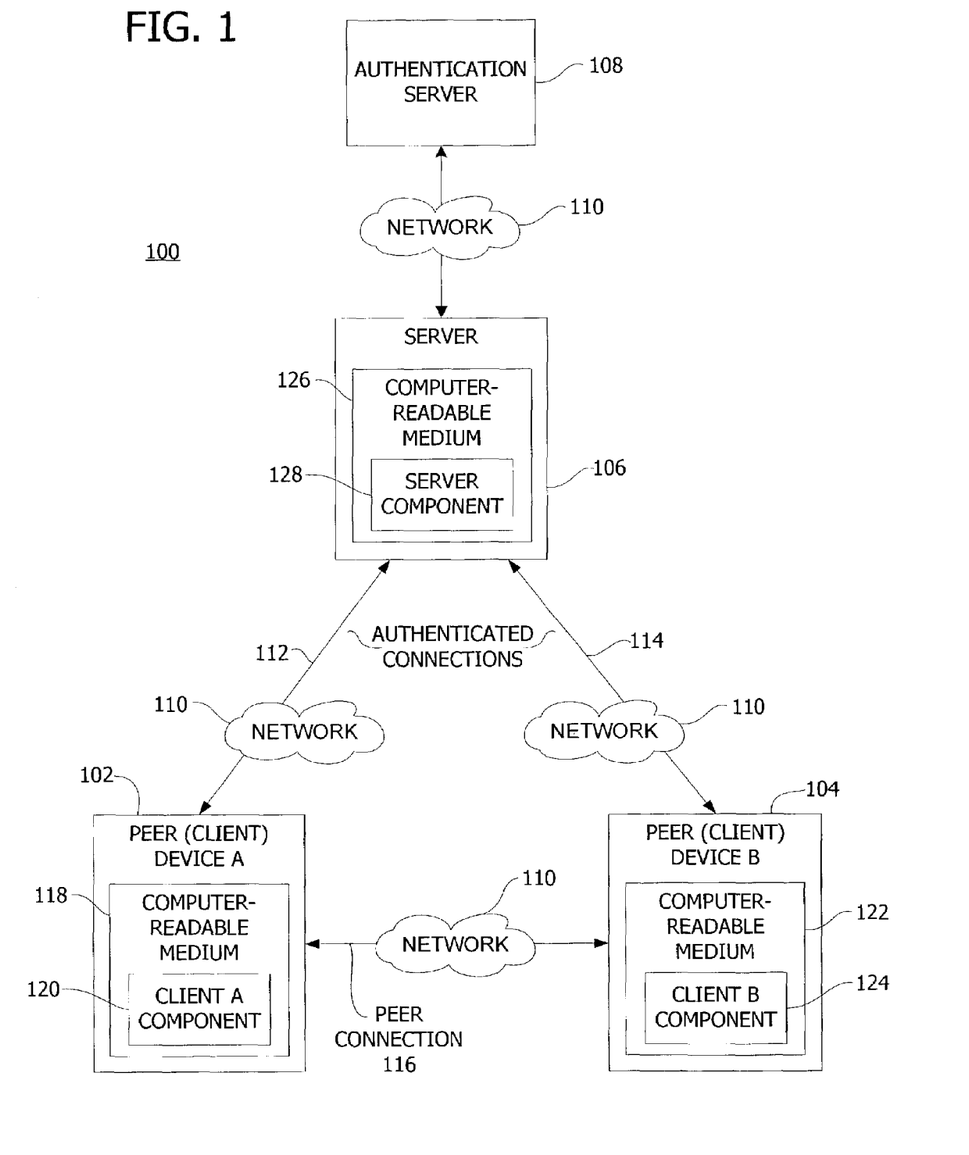
FIG. 1 is an exemplary embodiment of peer devices communicating with a server and each other.

A computer system according to one embodiment of the present invention is shown in FIG. 1 and indicated generally by reference character 100. The computer system 100 includes computer devices 102, 104 (also referred to herein as peer device A or client A and peer device B or client B, respectively) and a central server 106. In one embodiment, the computer devices 102, 104 are considered peer devices because the devices 102, 104 use the same program or type of program to communicate and share data with one another, as further explained below.

As shown in FIG. 1, the peer devices 102, 104 each have an authenticated or otherwise trusted connection 112, 114 to the server 106. In one embodiment, these connections 112, 114 are trusted in that the connections 112, 114 have been authenticated by the server 106 using a suitable client-server authentication mechanism. For example, server 106 may authenticate the devices 102, 104 by accessing an authentication server 108 or other security component such as a multi-site user authentication system. Thus, the peer devices 102, 104 know that they are connected to the server 106 (rather than some other entity) and, conversely, the server 106 knows that it is connected to the peer devices 102, 104. It is contemplated by the inventors that there may be a plurality of servers such as server 106 accessing the authentication server 108 via authenticated and encrypted connections to authenticate peer devices.

In one example, the server 106 is an instant messaging server, and the peer devices 102, 104 each include an instant messaging client for communicating with the instant messaging server over the authenticated connections 112, 114. It should be understood, however, that the teachings of the invention are not limited to instant messaging services, and that a variety of other types of communication-oriented servers and clients may be employed without departing from the scope of the present invention. For example, the servers may be community or financial web sites authenticating members via a multi-site user authentication system. Another example includes gaming applications where the gaming application on each peer machine connects to a central gaming server. In addition, the server 106 may be a single server or a cluster of one or more servers in collaboration with one another.

A computer-readable medium 118 of the peer device A 102 stores a client A component 120. Likewise, a computer-readable medium 122 of the peer device B 104 stores a client B component 124. A computer-readable medium 126 of the server 106 stores a server component 128. In one embodiment, the client A component 120, the client B component 124, and the server component 128 are computer-executable software components that implement the communication and interactions illustrated in FIGS. 1-3. The peer device A 102 executes the client A component 120, the peer device B 104 executes a client B component 124, and the server 106 executes a server component 128. Alternatively, the client A component 120, the client B component 124, and the server component 128 are hardware components associated with peer device A 102, peer device B 104, and server 106, respectively. One or more computer-readable media such as computer-readable media 118, 122, 126 store computer-executable instructions for performing the methods illustrated in FIGS. 1-3 and described herein.

To facilitate authenticating a peer connection 116 between the peer devices 102, 104, one of the peer devices is configured to transmit a shared key (e.g., a secret session key or other key randomly generated in a cryptographic manner) to the other peer device via the authenticated connections 112, 114 to the server 106. In one embodiment, the server 106 facilitates or otherwise allows the exchange of the secret session key in encrypted form between the client A component 120 and the client B component 124. That is, the server 106 receives the secret session key from one of the client components, and transmits the received session key to the other client component. The peer connection 116 is direct or peer-to-peer in that the peer devices 102, 104 communicate directly with one another, or otherwise bypass the server 106. The authenticated connections 112, 114 are also referred to as first connections, while the peer connection 116 is referred to as a second connection.

In one embodiment, communications sent over the authenticated connections 112, 114 are transmitted in clear text. Therefore, the secret session key is encrypted prior to its transmission, for security reasons. Alternatively, encrypted and authenticated connections 112, 114 between the server 106 and the peer devices 102, 104 may be employed. Additionally, the peer devices 102, 104 are configured for establishing the peer connection 116 therebetween, and for authenticating the peer connection 116 using the secret session key transmitted from one peer device to the other via the authenticated connections 112, 114 to the server 106. The session key is, for example, a variable key-size stream cipher such as a 40-bit stream cipher and can be used to encrypt and transmit files or other data.

The connections 112, 114, 116 and between the authentication server 108 and the server 106 in FIG. 1 may be direct connections. Alternatively, the connections 112, 114, 116 may be network connections via network 110 or any other network or combination of networks such as described with reference to FIG. 4. For example, the connections may be wireless connections via a wireless medium. For convenience, the network 110 is shown to be same for all connections in FIG. 1. However, it is contemplated that each of connections 112, 114, and 116 may or may not include one or more types of networks, where each of connections 112, 114, and 116 are independent of the other connections. Those skilled in the art will note that the invention system and software is operable with any implementation of connections 112, 114, 116 and between the authentication server 108 and the server 106. In one embodiment, connection 110 between the server 108 and the server 106 is an authenticated and encrypted connection. In addition, while FIG. 2 and FIG. 3 omit an illustration of network 110 for convenience, it is contemplated by the inventors that network 110 may or may not be implemented for the connections in FIGS. 1-3 in various embodiments of the invention. Further, in another embodiment, the client components 120, 124 illustrated in FIG. 1 execute on the same computer or peer device and, thus, the peer devices 102, 104 may be considered peer application programs. In yet another embodiment, the client components 120, 124 and the server component 128 execute on the same computing device.

Figure 2:
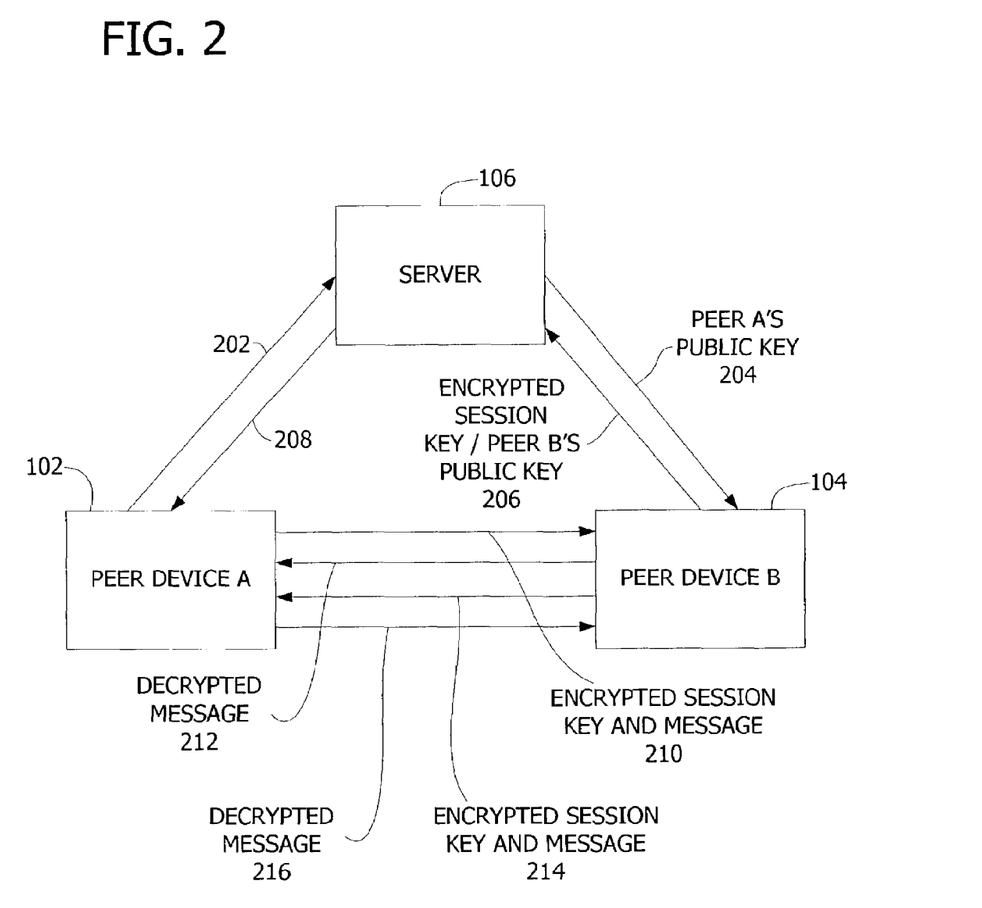
FIG. 2 is an exemplary block diagram illustrating a series of communications for authenticating a peer connection between the peer devices illustrated in FIG. 1.

One exemplary method for establishing and authenticating the peer connection 116 between the peer devices 102, 104 will now be described with reference to FIG. 2. In this embodiment, each peer device 102, 104 has a unique public/private key pair associated therewith. For example, the unique public/private key pair may include 512 bit keys with Rivest-Shamir-Adleman (RSA) encryption. Initially, peer device A 102 transmits its public key to peer device B 104 (in clear text) via the authenticated connections 112, 114 to the server 106 (assuming peer device B does not already possess peer device A's public key) along with a request to establish a direct peer-to-peer connection. This is indicated by arrows 202, 204 in FIG. 2. Peer device B 104, upon receiving such a request to establish a peer-to-peer connection, may optionally display a user interface for the user of peer device B 104 to accept the request. If the request is accepted (e.g., automatically or through user acceptance), peer device B 104 uses peer device A's public key to encrypt a secret session key. In one embodiment, the secret session key is generated randomly by peer device B 104 using cryptographic algorithms and is generated uniquely for each request that is received for a peer-to-peer connection. Peer device B 104 then transmits the encrypted session key to peer device A 102, again via the authenticated connections 112, 114 to the server 106. This is indicated by arrows 206, 208 in FIG. 2. In addition to the encrypted session key, peer device B 104 also transmits its own public key to peer device A 102 via the authenticated connections 112, 114 (assuming peer device A 102 does not already possess peer device B's public key), as indicated in FIG. 2. By sending such an encrypted session key along with its own public key, peer device B 104 indicates that the user of peer device B 104 has accepted the request from peer device A 102 to establish a direct peer-to-peer connection.

Peer device A 102 uses its private key to decrypt the secret session key received from peer device B 104 via the authenticated connections 112, 114. Peer device A 102 also establishes the peer connection 116 to peer device B 104 by connecting to one of peer device B's communication ports. In one embodiment, peer device A 102 obtains appropriate address information for peer device B 104, (e.g., an Internet Protocol address) from server 106 to establish the peer connection 116. In particular, server 106 receives a request from client A component 120 for an identifier associated with client B component 124. The server 106 transmits the requested identifier to client A component 120. The client A component 120 of peer device A 102 and the client B component 124 of peer device B 104 establish the peer connection based on the identifier.

In one embodiment, peer device B 104 randomly and dynamically allocates a communication port (e.g., a TCP/IP port) for receiving the peer connection 116, and provides appropriate communication port information to peer device A 102 along with the encrypted session key and peer device B's public key. Because establishing the peer connection 116 requires peer device B 104 to open a communication port, there is a risk that a rogue application or other unauthorized or unintended application will attempt to connect to the open port prior to peer device A 102, or attempt to swamp peer device B 104 with numerous incoming connections. For this reason, peer device B 104 allocates a communication port for the peer connection 116 randomly and dynamically. Rather than holding the port open at all times, it is opened only when a peer device is expected to connect thereto. For example, a port is opened in response to receiving an incoming request to establish a peer-to-peer connection from peer device A 102 via the authenticated connections 112, 114 to the server 106 and the request is accepted by the user of peer device B 104. If a request to open peer connection 116 is not received within a specific timeout period, the port is closed. In another embodiment, the port may be closed if it is determined or detected that rogue applications are attempting to connect to the port. Rogue applications can be detected if multiple connections are attempted and subsequent data exchanges over those attempted connections do not follow the authentication protocol described herein or if authentication fails. It is contemplated that a plurality of peer-to-peer connections may be supported via a single, opened communication port. In such an embodiment, the shared key acts as an identifier to identify a specific peer-to-peer connection.

In the particular embodiment under discussion, peer device A 102 encrypts the session key using peer device B's public key, and encrypts a unique message using the session key. The unique message can be any cryptographic data, such as 512 bits of randomly generated data. Peer device A 102 then transmits the encrypted session key and message to peer device B 104 via the peer connection 116, as indicated by arrow 210 in FIG. 2. Peer device B 104 uses its private key to decrypt the session key received from peer device A 102 via the peer connection 116. Peer device B 104 compares the session key received from peer device A 102 via the peer connection 116 with the session key initially transmitted to peer device A 102 via the authenticated connections 112, 114 in response to the request from peer device A 102 to establish a direct peer-to-peer connection. By confirming that the session key received from peer device A 102 via the peer connection 116 is the same as the session key transmitted to peer device A 102 via the authenticated connections 112, 114 to the server 106, peer device B 104 verifies (i.e., authenticates) peer device A's identity.

Note that once the peer connection 116 is established, peer device B 104 expects to receive specific data (e.g., the encrypted session key and a 512 bit message) from the connecting entity. If this data is not received within a specific timeout period or if the data received is other than what was expected, the peer connection 116 is dropped by peer device B 104.

Using the secret session key, peer device B 104 also decrypts the message received from peer device A 102 via the peer connection 116, and then transmits the decrypted message to peer device A 102 (in clear text or otherwise unencrypted) via the peer connection 116, as indicated by arrow 212 in FIG. 2. Peer device A 102 compares the decrypted message with the unencrypted message later encrypted and transmitted to peer device B 104. By confirming that the decrypted message received from peer device B 104 via the peer connection 116 is the same as the message previously transmitted to peer device B 104 in encrypted form, peer device A 102 verifies that peer device B 104 possesses the secret session key, and therefore verifies (i.e., authenticates) peer device B's identity. Note that had the peer device A 102 not received the decrypted message from peer device B 104 within a specific timeout interval or had the data received from peer device B 104 been something other than the decrypted message, peer device A 102 would have dropped the connection 116 considering it to be an incorrect or rogue connection. Having thus authenticated the devices on both ends of the peer connection 116, the peer devices 102, 104 may proceed to exchange messages, files, or other data directly with one another via the peer connection 116. If desired, such data transfers can be encrypted using the shared secret session key, the public/private key pairs, or any other suitable encryption mechanism.

It is contemplated by the inventors that peer device A 102 and peer device B 104 are interchangeable in the exemplary authentication scenario described above. That is, the exchanges (i.e., transmitting and receiving) of the session key and message may originate with either of peer device A 102 or peer device B 104.

In the embodiment of FIG. 2, peer device B 104 is configured to generate the secret session key upon receiving peer device A's public key via the authenticated connections 112, 114. A unique session key is generated for each peer-to-peer connection 116, not only for security purposes, but also for enabling peer device B 104 to distinguish incoming connections from multiple peer devices by reference to their associated (and unique) session keys. In other words, peer device B 104 maintains the context of which session key was handed out for which peer. As a result, when an incoming peer connection is received by peer device B 104, it uses the session key to determine which peer established the peer connection. In this manner, multiple incoming peer connections can be received on the same communication port.

Those skilled in the art recognize that if a network address translator (NAT) or a firewall separates the peer devices 102, 104, then peer device B 104 may not be able to accept incoming connections from other peers in a computer network such as the Internet. This is because the local address of peer device B 104 behind the NAT/firewall may not be visible to or accessible by other peers (assuming the required communication port cannot be exposed programmatically in the NAT/firewall) One method for addressing this situation will now be described with reference to FIG. 2. Peer device A 102 initially transmits its public key to peer device B 104 via the authenticated connections 112, 114 to the server 106 (as indicated by arrows 202, 204), and peer device B 104 responds by providing an encrypted session key and its own public key also via the authenticated connections 112, 114 (as indicated by arrows 206, 208), in the same manner that was described above. However, when peer device A 102 attempts to establish a peer connection such as peer connection 116 on a specified communication port of peer device B 104, peer device A 102 is unable to do so due to the NAT/firewall (not shown). Thus, peer device B 104 times out after a preset time period waiting for an incoming connection from peer device A 102. Recognizing that it may be unable to receive an incoming connection from peer device A 102 due to a NAT/firewall, peer device B 104 initiates an attempt to connect to a communication port of peer device A 102. In one embodiment, peer device B 104 obtains appropriate address information for peer device A 102 from the server 106 to establish the peer connection 116. Contemporaneously, peer device A 102 times out trying to connect to peer device B 104, and assumes this may be due to a NAT/firewall. Thus, peer device A 102 opens a communication port (e.g., the same communication port dynamically allocated by peer device B 104) and waits for peer device B's incoming connection.

Once peer device B 104 establishes the peer connection such as peer connection 116 to peer device A 102, the authentication process described above continues, but in reverse. Thus, peer device B 104 encrypts the secret session key using peer device A's public key, and also encrypts a unique message using the session key. The encrypted session key and message are then transmitted from peer device B 104 to peer device A 102 via the peer connection 116, as indicated by arrow 214 in FIG. 2. Peer device A 102 uses its private key to decrypt the session key received from peer device B 104 via the peer connection 116. By confirming that the session key received from peer device B 104 via the peer connection 116 is the same as the session key received from peer device B 104 via the authenticated connections 112, 114 to the server 106, peer device A 102 verifies (i.e., authenticates) peer device B's identity.

Using the secret session key, peer device A 102 also decrypts the message received from peer device B 104 via the peer connection 116, and then transmits the decrypted message to peer device B 104 (in clear text or otherwise unencrypted) via the peer connection 116, as indicated by arrow 216 in FIG. 2. By confirming that the decrypted message received from peer device A 102 via the peer connection 116 is the same as the message previously transmitted to peer device A 102 in encrypted form, peer device B 104 verifies that peer device A 102 possesses the secret session key, and therefore verifies (i.e., authenticates) peer device A's identity. Note that in this alternative embodiment, only peer device A's public/private key pair is used for authenticating the peer connection 116.

Figure 3:
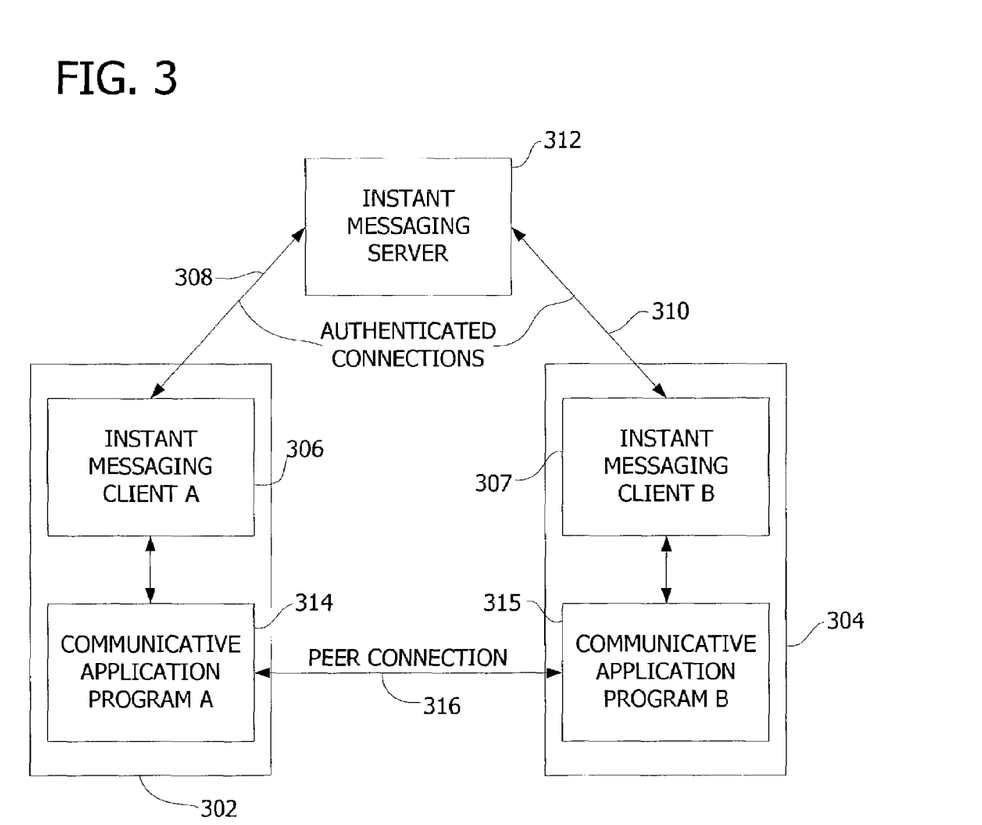
FIG. 3 is an exemplary block diagram illustrating an implementation of the invention within an instant messaging environment.

FIG. 3 illustrates one implementation of the present invention in an instant messaging context. As shown in FIG.

3, two peer devices 302, 304 each include an instant messaging client such as instant messaging client A 306 and instant messaging client B 307 for establishing authenticated connections 308, 310 to an instant messaging server 312, respectively. Each of the peer devices 302, 304 also includes one or more communicative application programs such as communicative application program A 314 and communicative application program B 315 (e.g., a communicative video game application or a file sharing program). The communicative application programs 314, 315 interface with the instant messaging clients 306, 307 that in turn interface with the instant messaging server 312 to establish and authenticate a peer connection 316 between the peer devices 302, 304 in a manner described above with reference to FIG. 1 and FIG. 2. For example, when the communicative application program 314 is installed, it registers itself with the instant messaging client 306 in the same device as a valid application (e.g., using an API provided by the instant messaging client). In one embodiment, the communicative application programs 314, 315 also generate the public/private key pair required by each peer device 302, 304 in the authentication process.

At startup, each communicative application program 314, 315 communicates with the instant messaging server 312 through the instant messaging client 306, 307 in such a manner as to authenticate itself with the instant messaging server 312 as an application permitted to use the instant messaging client API for communicating with peer devices. Once authenticated, the communicative application program 314 in peer device 302 can establish a communication channel with the communicative application program 315 in peer device 304 (e.g., by sending a session invitation), or vice versa, via the authenticated connections 308, 310 to the instant messaging server 312. The communicative application programs 314, 315 proceed to exchange data through the authenticated connections 308, 310, and through the peer connection 316, in the manner described above with reference to FIG. 1 and FIG. 2 to authenticate the peer devices 302, 304 on each end of the peer connection 316. In this manner, the communicative application programs 314, 315 utilize an existing instant messaging infrastructure for establishing and authenticating the peer connection 316 between the peer devices 302, 304.

Figure 4:
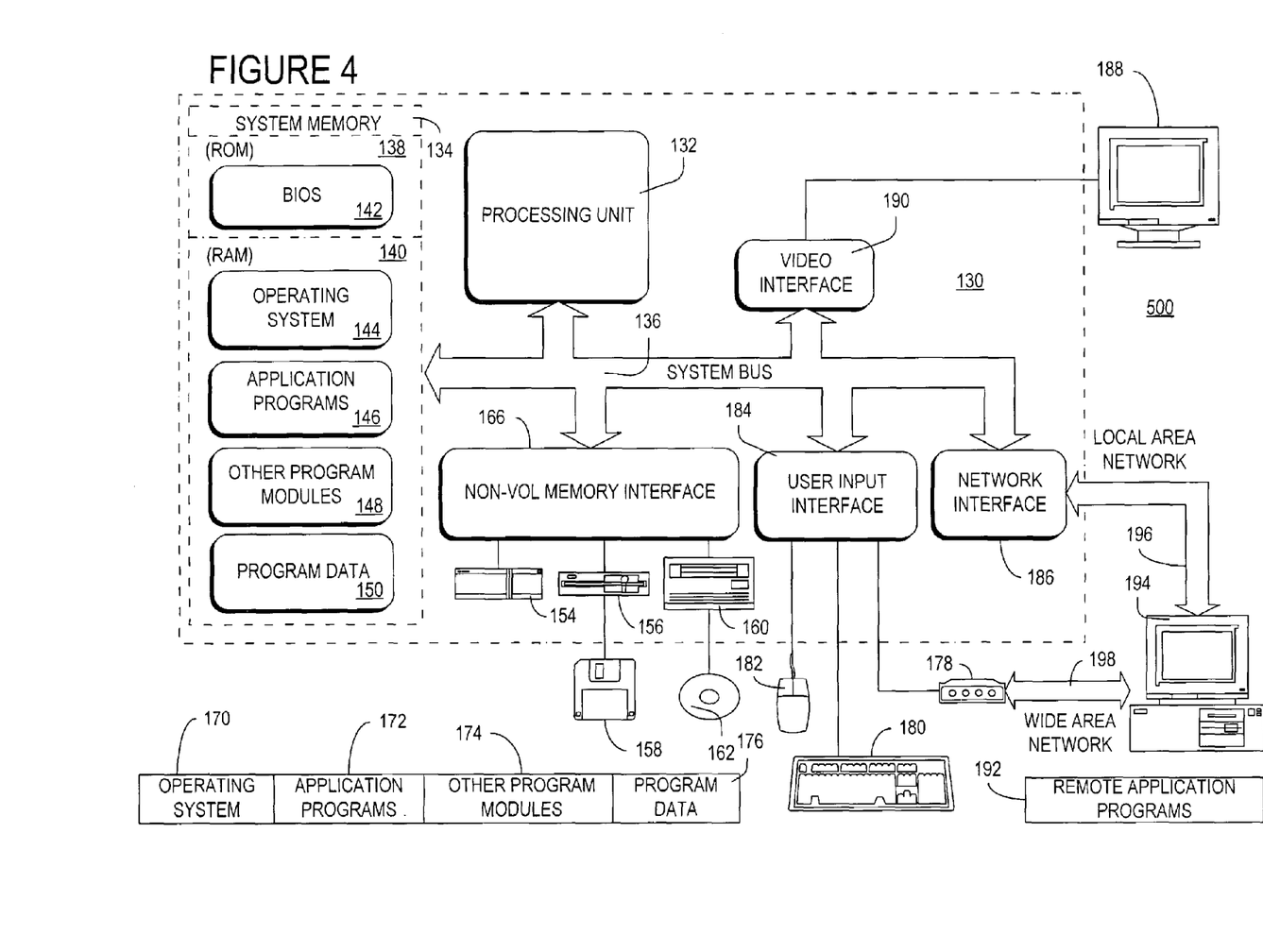
FIG. 4 is a block diagram illustrating one example of a suitable computing system environment in which the invention may be implemented.

FIG. 4 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, LEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scone of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as disc recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIGS. 1-3 to perform a method of securing information between a first device and a second device comprising:

establishing authenticated connections to a server from the first device and from the second device;

encrypting, in the first device, a shared secret session key using a public key associated with the second device;

transmitting the shared secret session key as encrypted using the public key associated with the second device from the first device to the second device via the authenticated connections to the server;

decrypting, in the second device, the shared secret session key received from the first device using the private key of the second device;

establishing a peer connection between the first device and the second device;

encrypting, in the second device, the shared secret session key received from the first device using a public key associated with the first device;

transmitting the shared secret session key as encrypted using the public key associated with the first device from the second device to the first device via the peer connection;

decrypting, in the first device, the shared secret session key received from the second device using the private key of the first device; and confirming, in the first device, that the shared secret session key received from the second device via the peer connection is the same as the shared secret session key transmitted to the second device via the authenticated connections to the server to thereby authenticate the second device.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of establishing and authenticating a peer-to-peer connection between at least two client components, said client components each having an authenticated connection to a server, said method comprising:
    exchanging through the server a shared key between the client components via the authenticated connections to the server;
    establishing a peer-to-peer connection between the client components, said peer-to-peer connection excluding the server;
    exchanging said shared key between the client components via the established, peer-to-peer connection;
    comparing said shared key exchanged via the peer-to-peer connection with said shared key exchanged via the authenticated connection to the server, wherein a first one of the client components authenticates a second one of the client components responsive to said comparing by verifying that said shared key exchanged via the peer-to-peer connection corresponds to said shared key exchanged via the authenticated connections to the server,
    encrypting, by the second one of the client components, a first message using the shared key;
    transmitting the encrypted first message from the second one of the client components to the first one of the client components via the peer-to-peer connection, wherein the first one of the client components decrypts the received encrypted message using the shared key to create a second message;
    receiving, by the second one of the client components, the decrypted second message from the first one of the client components via the peer-to-peer connection; and
    comparing, by the second one of the client components, the first message with the second message to confirm that the first one of the client components possesses the shared key to thereby authenticate the first one of the client components.

2. The method of claim 1, wherein exchanging a shared key between the client components via the server comprises exchanging a shared key in encrypted form between the client components via the server.

3. The method of claim 1, wherein exchanging a shared key between the client components via the server comprises exchanging a shared key between the client components via the authenticated connection with the server.

4. The method of claim 1, wherein exchanging the shared key between the client components via the established, peer-to-peer connection comprises exchanging the shared key in encrypted form between the client components via the established, peer-to-peer connection.

5. The method of claim 1, wherein the shared key comprises a randomly-generated, single-use session key.

6. The method of claim 1, further comprising:
    receiving a message in encrypted form from one of the client components via said peer-to-peer connection;
    decrypting the received message using the shared key; and
    transmitting the decrypted message to said one of the client components.

7. The method of claim 1, wherein said establishing comprises:
    transmitting a request for an identifier associated with said one of the client components to the server; and
    receiving the requested identifier from the server; and
    establishing the peer-to-peer connection with said one of the client components using the received identifier.

8. The method of claim 7, wherein said identifier comprises a network address.

9. The method of claim 8, wherein said identifier further comprises a communication port.

10. The method of claim 1, wherein said establishing comprises:
    receiving, from one of said client components via the authenticated connection to the server, a request to establish a peer-to-peer connection; and
    opening a communication port in response to the received request.

11. The method of claim 10, wherein opening comprises randomly determining the communication port to open.

12. The method of claim 10, further comprising closing the opened communication port if one or more rogue applications are attempting to connect on the opened communication port.

13. The method of claim 10, wherein said establishing comprises establishing a plurality of peer-to-peer connections between a plurality of client components via the opened communication port, and wherein said shared key identifies each of the established connections.

14. The method of claim 1, wherein said establishing comprises:
    attempting to connect with one of the client components; and
    if said attempting fails, waiting for a preset time period for said one of the client components to initiate establishing the peer-to-peer connection.

15. The method of claim 1, wherein said establishing comprises storing the shared key in memory for a preset time period.

16. The method of claim 1, further comprising randomly generating the shared key in a cryptographic manner in response to a request to establish a peer-to-peer connection between the client components.

17. The method of claim 1, wherein the shared key is a shared secret session key.

18. The method of claim 1, further comprising:
    encrypting data with the shared key; and
    transferring the encrypted data between the client components via the authenticated, peer-to-peer connection.

19. The method of claim 1, wherein one or more computer-readable media have computer-executable instructions for performing the method of claim 1.

20. A method of establishing and authenticating a peer connection between a first device and a second device, the first device and the second device having authenticated connections to a server, said method comprising:
    enabling the first device and the second device to exchange, through the server, a shared key in encrypted form via the authenticated connections to the server;

receiving, via the authenticated connections to the server, a request from the first device for an identifier associated with the second device;

transmitting, via the authenticated connections to the server, the requested identifier to the first device, wherein the first device and the second device establish the peer connection based on the identifier, said peer connection excluding the server;

enabling the first device and the second device to exchange said shared key in encrypted form via the established, peer connection;

comparing said shared key exchanged via the peer connection with said shared key exchanged via the authenticated connections to the server;

enabling the first device and the second device to authenticate each other responsive to said comparing by verifying, by the first device and the second device, that said shared key exchanged via the peer connection corresponds to said shared key exchanged via the authenticated connections to the server, wherein the first device encrypts a first message using the shared key and transmits the encrypted first message to the second device via the peer-to-peer connection, wherein the second device decrypts the first message using the shared key to create a second message and transmits the second message to the first device via the peer-to-peer connection to enable the first device to confirm that the second device possesses the shared key to thereby authenticate the second device.

21. The method of claim 20, wherein said receiving comprises receiving a request from the first device for a network identifier associated with the second device.

22. The method of claim 20, wherein said enabling the first device and the second device to exchange the shared key comprises:
receiving the shared key in encrypted form from the first device via the authenticated connections; and
transmitting the received shared key in encrypted form to the second device via the authenticated connections.

23. The method of claim 20, wherein said enabling the first device and the second device to exchange the shared key comprises:
receiving the shared key in encrypted form from the second device via the authenticated connections; and
transmitting the received shared key in encrypted form to the first device via the authenticated connections.

24. The method of claim 20, wherein the shared key comprises a randomly-generated, single-use cryptographic session key.

25. The method of claim 20, wherein the shared key is randomly generated in a cryptographic manner in response to a request to establish a peer-to-peer connection between the first device and the second device.

26. The method of claim 20, wherein the server is an instant messaging server, and the first device and the second device are instant messaging clients.

27. The method of claim 20, wherein one or more computer-readable media have computer-executable instructions for performing the method of claim 20.

28. One or more computer storage media having computer-executable components comprising:
a server component;
one or more client components, wherein each of the client components has an authenticated connection to the server component, and wherein the server component interacts with each of the client components via the authenticated connection to establish a peer connection between one or more of the client components, said established peer connection excluding the server; and
at least one communicative application program associated with a first one of the client components, said communicative application program configured to interface with said first one of the client components to transmit through the server component a shared key in encrypted form from said first one of the client components to a second one of the client components via said authenticated connection to the server component, and said communicative application program configured to establish the peer connection between the first one of the client components and the second one of the client components using said shared key, said communicative application program further configured to interface with said first one of the client components to transmit said shared key in encrypted form from said first one of the client components to said second one of the client components via said established peer connection, wherein said second one of the client components receives said shared key transmitted from said first one of the client components and further transmits the received shared key back to said first one of the client components via said established peer connection, wherein said communicative application program is configured to interface with said first one of the client components to receive said shared key from said second one of the client components via the established peer connection and to compare said shared key received from said second one of the client components via said established peer connection with said shared key transmitted from said first one of the client components to said second one of the client components via said authenticated connection to the server component, wherein the communicative application program then authenticates said second one of the client components responsive to the comparison by verifying that said shared key received from said second one of the client components via said established peer connection corresponds to said shared key transmitted from said first one of the client components to said second one of the client components via said authenticated connections to the server component; wherein the first one of the client components encrypts a first message using the shared key and transmits the encrypted first message to the second one of the client components via the peer connection, wherein the second one of the client components decrypts the first message using the shared key to create a second message and transmits the second message to the first one of the client components via the peer connection to enable the first one of the client components to confirm that the second one of the client components possesses the shared key to thereby authenticate the second one of the client components.

29. The computer storage media of claim 28, wherein the server component and the client components implement instant messaging.

30. The computer storage media of claim 28, wherein the shared key comprises a randomly-generated, single-use session key.

31. The computer storage media of claim 28, wherein the shared key is randomly generated in a cryptographic manner in response to a request to establish a peer-to-peer connection between the first device and the second device.

32. The computer storage media of claim 28, wherein said server component is one of a plurality of server components, and further comprising a security component connected to the plurality of server components via one or more authenticated and encrypted connections for authenticating the client components.

33. A method of securing information between a first device and a second device, the method comprising:
establishing authenticated connections to a server from the first device and from the second device, wherein the first device encrypts
a shared key using a public key associated with the second device and transmits
said shared key as encrypted using the public key associated with the second device to the server via said authenticated connection and from the server to the second device via said authenticated connection;
decrypting, in the second device, said shared key received from the first device;
establishing a peer connection between the first device and the second device, said peer connection excluding the server;
encrypting, in the second device, said shared key received from the first device using a public key associated with the first device;
transmitting said shared key as encrypted using the public key associated with the first device from the second device to the first device via said peer connection, wherein the first device decrypts
said shared key received from the second device; and
confirms that said shared key received from the second device via said peer connection is the same as said shared key transmitted to the second device via said authenticated connections to the server to thereby authenticate the second device; and
encrypting, by the second device, a first message using the shared key;
transmitting the encrypted first message from the second device to the first device via the peer connection, wherein the first device decrypts the received encrypted message using the shared key to create a second message;
receiving, by the second device, the decrypted second message from the first device via the peer connection; and
comparing, by the second device, the first message with the second message to confirm that the first device possesses the shared key to thereby authenticate the first device.

34. The method of claim 33 further comprising transmitting the public key associated with the second device from the second device to the first device via said authenticated connections to the server.

35. The method of claim 33 further comprising transmitting the public key associated with the first device from the first device to the second device via said authenticated connections to the server.

36. The method of claim 33 further comprising generating the shared key in the first device.

37. The method of claim 36 wherein generating comprises generating a shared key unique to said peer connection.

38. The method of claim 36, wherein generating comprises randomly generating the shared key in a cryptographic manner in response to a request to establish a peer-to-peer connection between the first device and the second device.

39. The method of claim 33, wherein establishing a peer connection includes transmitting communication port information from the first device to the second device, and using said communication port information in the second device to establish the peer connection with the first device.

40. The method of claim 33, wherein the shared key comprises a randomly-generated, single-use cryptographic session key.

41. The method of claim 33, wherein the server is an instant messaging server, and the first device and the second device are instant messaging clients.

42. The method of claim 33, wherein one or more computer-readable media have computer-executable instructions for performing the method of claim 33.

43. A method of securing information between a first device and a second device, the method comprising:
establishing authenticated connections to a server from the first device and from the second device;
encrypting, in the first device, a shared key using a public key associated with the second device;
transmitting said shared key as encrypted using the public key associated with the second device from the first device to the common server via said authenticated connection and from the common server to the second device via said authenticated connection, wherein the second device decrypts
said shared key received from the first device;
establishing a peer connection between the first device and the second device, said peer connection excluding the common server;
transmitting said shared key as encrypted using the public key associated with the second device from the first device to the second device via said peer connection, wherein the second device decrypts
said shared key received from the first device via said peer connection, wherein the second device confirms
that said shared key received from the first device via said peer connection is the same as said shared key received from the first device via said authenticated connections to the server to thereby authenticate the first device;
encrypting, by the first device, a first message using the shared key;
transmitting the encrypted first message from the first device to the second device via the peer connection, wherein the second device decrypts the received encrypted message using the shared key to create a second message;
receiving, by the first device, the decrypted second message from the second device via the peer connection; and
comparing, by the first device, the first message with the second message to confirm that the second device possesses the shared key to thereby authenticate the second device.

44. The method of claim 43 further comprising transmitting the public key associated with the second device from the second device to the first device via said authenticated connections to the server.

45. The method of claim 43 further comprising generating the shared key in the first device.

46. The method of claim 45 wherein generating comprises generating a shared key unique to said peer connection.

47. The method of claim 45, wherein generating comprises randomly generating the shared key in a cryptographic manner in response to a request to establish a peer-to-peer connection between the first device and the second device.

48. The method of claim 43 wherein establishing a peer connection includes transmitting communication port information from the first device to the second device, and using said communication port information in the second device to establish the peer connection with the first device.

49. The method of claim 43, wherein the shared key comprises a randomly-generated, single-use cryptographic session key.

50. The method of claim 43, wherein the server is an instant messaging server, and the first device and the second device are instant messaging clients.

51. The method of claim 43, wherein one or more computer-readable media have computer-executable instructions for performing the method of claim 46.

* * * * *